US012756290B2

(12) United States Patent
Kondo et al.

(10) Patent No.: US 12,756,290 B2
(45) Date of Patent: Oct. 6, 2026

(54) POWER CONVERSION DEVICE

(71) Applicant: Mitsubishi Electric Corporation, Tokyo (JP)

(72) Inventors: Ryota Kondo, Tokyo (JP); Yoshiaki Ishiguro, Tokyo (JP); Kohei Onda, Tokyo (JP); Hisatoshi Fukumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 157 days.

(21) Appl. No.: 18/858,335

(22) PCT Filed: Jan. 11, 2023

(86) PCT No.: PCT/JP2023/000374
§ 371 (c)(1),
(2) Date: Oct. 21, 2024

(87) PCT Pub. No.: WO2023/238430
PCT Pub. Date: Dec. 14, 2023

(65) Prior Publication Data

US 2025/0274027 A1 Aug. 28, 2025

(30) Foreign Application Priority Data

Jun. 10, 2022 (JP) ................................ 2022-094059

(51) Int. Cl.
*H02M 1/08* (2006.01)
*H02M 1/00* (2006.01)
*H02M 7/537* (2006.01)

(52) U.S. Cl.
CPC .......... *H02M 1/0048* (2021.05); *H02M 1/08* (2013.01); *H02M 7/537* (2013.01)

(58) Field of Classification Search
CPC ....... H02M 1/0048; H02M 1/08; H02M 7/537
See application file for complete search history.

(56) References Cited

U.S. PATENT DOCUMENTS

2025/0183814 A1* 6/2025 Kojima ................ H02M 7/487

FOREIGN PATENT DOCUMENTS

JP 2005-311956 A 11/2005
JP 2006-020418 A 1/2006

OTHER PUBLICATIONS

International Search Report and Written Opinion mailed on Mar. 14, 2023, received for PCT Application PCT/JP2023/000374, filed on Jan. 11, 2023, 8 pages including English Translation.

* cited by examiner

*Primary Examiner* — Adolf D Berhane
(74) *Attorney, Agent, or Firm* — XSENSUS LLP

(57) ABSTRACT

This power conversion device drives a semiconductor switching element through PWM control and performs conversion between DC and AC. A pulse width for the PWM control is set using a PWM carrier wave. With respect to a carrier frequency, a gate voltage of the semiconductor switching element, and a gate resistance thereof which are driving conditions for the semiconductor switching element, at a predetermined update timing, loss in the semiconductor switching element during a predetermined loss calculation period is obtained through calculation on the basis of the driving conditions at present. While the driving conditions are changed, processing of obtaining the loss during the loss calculation period through calculation is repeated a predetermined number of times, to determine the driving conditions that minimize the loss, and the semiconductor switching element is driven with the determined driving conditions.

18 Claims, 19 Drawing Sheets

PRESENCE(YES)/ABSENCE(NO) OF UPDATE OF EACH SETTING FUNCTION

| NUMBER OF COMBINATION | 1 | 2 | 3 | 4 | 5 | 6 | 7 | 8 |
|---|---|---|---|---|---|---|---|---|
| CARRIER FREQUENCY | NO | YES | YES | NO | NO | NO | YES | YES |
| GATE VOLTAGE | NO | NO | YES | YES | YES | NO | NO | YES |
| GATE RESISTANCE | NO | NO | NO | NO | YES | YES | YES | YES |

FIG. 12

POWER CONVERSION DEVICE

CROSS-REFERENCE TO RELATED APPLICATIONS

This application is a national stage application, pursuant to 35 U.S.C. § 371, of International Patent Application No. PCT/JP2023/000374, filed Jan. 11, 2023, which claims priority to Japanese Patent Application No. 2022-094059, filed Jun. 10, 2022, the entire contents of each are incorporated herein by reference.

TECHNICAL FIELD

The present disclosure relates to a power conversion device.

BACKGROUND ART

As a power conversion device that includes an inverter composed of a plurality of semiconductor switching elements, there is a power conversion device that performs conversion from DC to AC through ON/OFF control of a plurality of semiconductor switching elements by pulse width modulation, to supply power to a three-phase AC motor. In one of such power conversion devices, a total loss amount in the semiconductor switching elements per predetermined period is calculated as a sum of switching loss and steady loss, and a reduction method for the total loss amount is switched in accordance with the magnitude relationship between a reduction amount of the switching loss and an increase amount of the steady loss, so as to reduce loss (for example, Patent Document 1).

CITATION LIST

Patent Document

Patent Document 1: JP 2006-020418A

SUMMARY OF THE INVENTION

Problem to be Solved by the Invention

A gate voltage and a gate resistance which are driving variables for the semiconductor switching elements are fixed so as to satisfy a constraint condition in a current and voltage condition in which surge voltage or noise is maximized. Therefore, in the power conversion device as described in Patent Document 1, if the current and voltage condition is changed, the gate voltage and the gate resistance cannot be adjusted to such values that reduce loss.

The present disclosure has been made to solve the above problem, and an object of the present disclosure is to provide a power conversion device that can reduce loss when a current and voltage condition is changed.

Means to Solve the Problem

A power conversion device according to the present disclosure is a power conversion device comprising a driving controller which controls a semiconductor switching element through PWM control, and configured to perform conversion between DC and AC. The driving controller sets a pulse width for the PWM control using a PWM carrier wave, and with respect to a carrier frequency as a frequency of the PWM carrier wave, a gate voltage of the semiconductor switching element, and a gate resistance of the semiconductor switching element which are driving conditions for the semiconductor switching element, at a predetermined update timing, the driving controller obtains, through calculation, loss in the semiconductor switching element at present during a predetermined loss calculation period, on the basis of the driving conditions at present. The driving controller repeats, a predetermined number of times, processing of obtaining the loss during the loss calculation period through calculation while changing the driving conditions, to determine the driving conditions that minimize the loss, and controls the semiconductor switching element with the determined driving conditions.

Another power conversion device according to the present disclosure is a power conversion device comprising a driving controller which controls a semiconductor switching element through PWM control, and configured to perform conversion between DC and AC. The driving controller sets a pulse width for the PWM control using a PWM carrier wave, and with respect to a carrier frequency as a frequency of the PWM carrier wave, a gate voltage of the semiconductor switching element, and a gate resistance of the semiconductor switching element which are driving conditions for the semiconductor switching element, at a predetermined update timing, the driving controller obtains, through calculation, loss in the semiconductor switching element during a predetermined loss calculation period, on the basis of the driving conditions at present. In a case where the loss is greater than a predetermined value, the driving controller repeats, a predetermined number of times, processing of obtaining the loss during the loss calculation period through calculation while changing the driving conditions, to determine the driving conditions that minimize the loss, and controls the semiconductor switching element with the determined driving conditions.

Effect of the Invention

With the power conversion device according to the present disclosure, it is possible to provide a power conversion device that, when a current and voltage condition is changed, can set a gate resistance and a gate voltage of a semiconductor switching element to appropriate values, thus reducing loss.

BRIEF DESCRIPTION OF THE DRAWINGS

FIG. 12 illustrates presence/absence of update of each setting function in the driving condition setting unit of the power conversion device according to embodiment 1.

DESCRIPTION OF EMBODIMENTS

Embodiment 1

Figure 1:
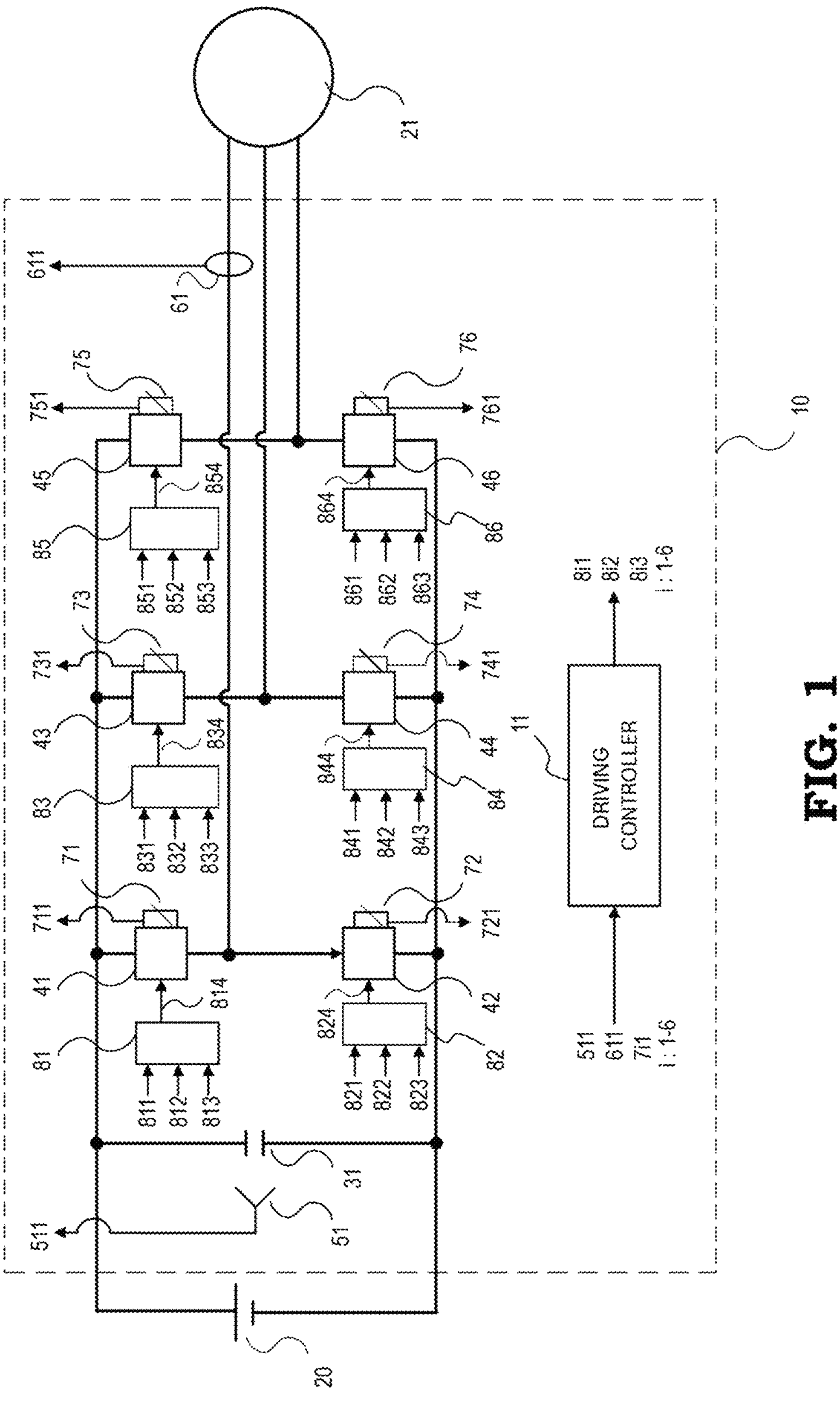
FIG. 1 is a schematic block diagram showing the configuration of a power conversion device according to embodiment 1.

FIG. 1 is a block diagram showing the configuration of a power conversion device according to embodiment 1. The power conversion device 10 converts DC power from a DC power supply 20 to three-phase AC power, to supply power to a motor 21. Conversely, the power conversion device 10 can also convert AC power generated in the motor 21 to DC power, to regenerate power to the DC power supply 20. The power conversion device 10 includes a driving controller 11 shown in FIG. 2, and controls semiconductor switching elements 41 to 46 composing the power conversion device 10. On the DC side of the power conversion device 10, normally, a smoothing capacitor 31 for smoothing power pulsation is provided. Here, the motor 21 is connected to the AC side of the power conversion device 10, but without limitation to the motor, any device that can be operated with AC may be connected to the AC side.

The driving controller 11 determines gate signals **8*i*1 (i=1 to 6), gate voltage reference values 8*i*2 (i=1 to 6), and gate resistance reference values 8*i*3 (i=1 to 6) for the semiconductor switching elements 41 to 46 (which may be referred to as 4*i* (i=1 to 6); also, numbers for values, signals, and the like corresponding to the respective semiconductor switching elements 4*i* may be referred to in the same manner), and outputs these signals to gate driving units 8*i* (i=1 to 6) for the respective semiconductor switching elements 4*i* (i=1 to 6). The gate driving units 8*i* (i=1 to 6) generate gate voltage signals 8*i*4 (i=1 to 6) for controlling the semiconductor switching elements 4*i* (i=1 to 6), on the basis of commands from the driving controller 11. The power conversion device 10 includes a voltage sensor 51 for detecting DC voltage of the DC power supply, a current sensor 61 for detecting AC current to be supplied to the motor 21, and temperature sensors 7*i* (i=1 to 6) for detecting the temperatures of the respective semiconductor switching elements 4*i*** (i=1 to 6).

Figure 11:
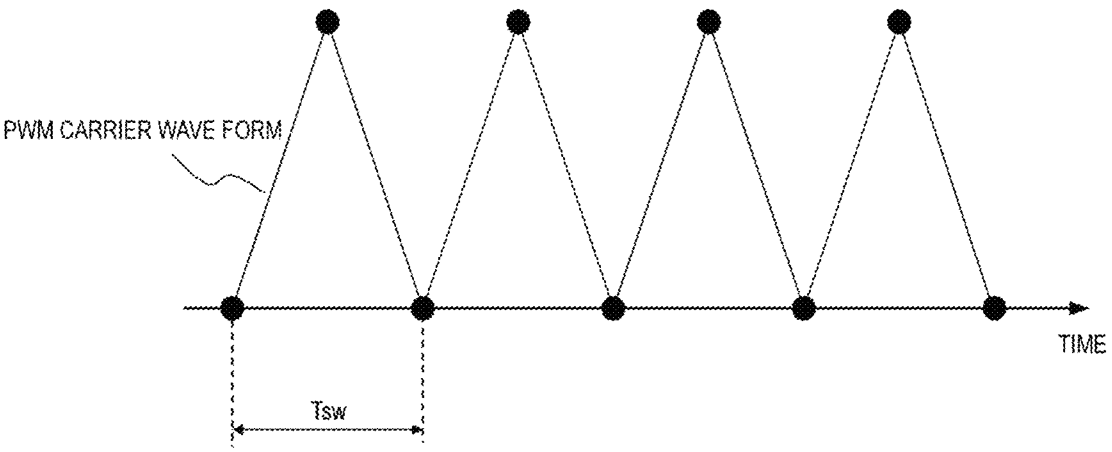
FIG. 11 illustrates the carrier wave and timings of changing each driving condition in the power conversion device according to embodiment 1.

With the above configuration, the power conversion device 10 converts DC power from the DC power supply 20 to AC power through ON/OFF operations of the semiconductor switching elements **4*i* (i=1 to 6) in accordance with the gate signals 8*i*1 (i=1 to 6), to drive the motor 21. Conversely, the power conversion device 10 can also convert AC power generated by the motor 21 to DC power through ON/OFF operations of the semiconductor switching elements 4*i* (i=1 to 6) in accordance with the gate signals 8*i*1 (i=1 to 6), to regenerate power to the DC power supply 20. Here, ON/OFF control of the semiconductor switching elements is PWM control in which the pulse width is controlled using a pulse width modulation (PWM) carrier wave as shown in FIG. 11 described later. In FIG. 1**, a case where the power conversion device has a three-phase full-bridge circuit of which the AC side has a three-phase AC configuration, is shown. However, features described in the present disclosure can be applied no matter which the AC side has a single-phase configuration or a multiphase configuration other than three phases, as long as the power conversion device has a DC-AC conversion circuit using PWM control.

Figure 2:
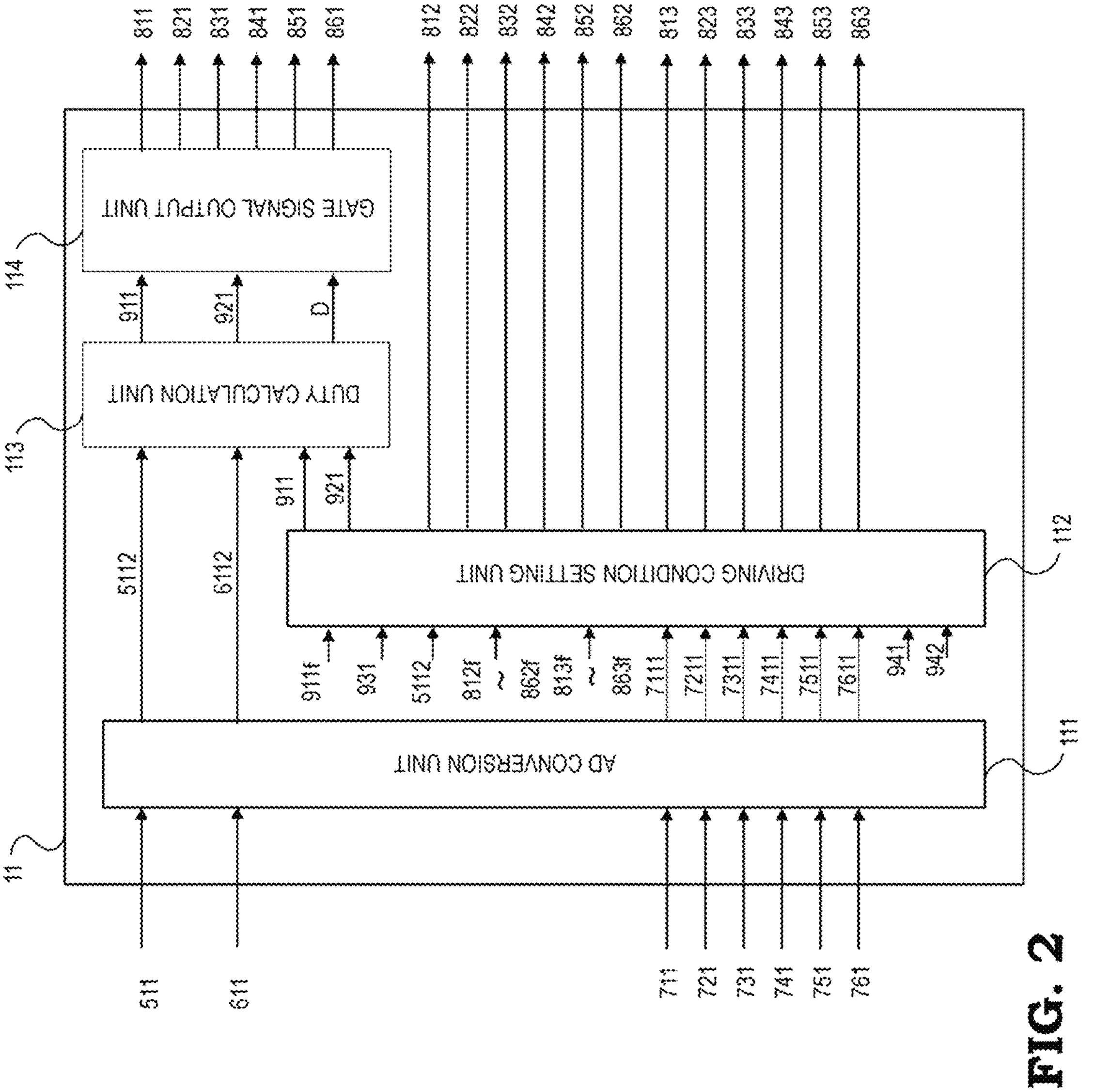
FIG. 2 is a block diagram showing the configuration of a driving controller of the power conversion device according to embodiment 1.

As shown in FIG. 2, the driving controller 11 includes an AD conversion unit 111, a driving condition setting unit 112, a duty calculation unit 113, and a gate signal output unit 114. The AD conversion unit 111 converts a DC voltage detection value 511 from the voltage sensor 51, a current detection value 611 of an AC current from the current sensor 61, and temperature detection values **7*i*1 (i=1 to 6) from the temperature sensors 7*i* (i=1 to 6), respectively, to a DC voltage detection signal 5112, a current detection signal 6112, and temperature detection signals 7*i*11 (i=1 to 6) which are digital signals, by sampling or the like. The driving condition setting unit 112 determines driving conditions for the semiconductor switching elements using the signals from the AD conversion unit 111 and the like. Here, the determined driving conditions are a carrier frequency, a gate voltage, and a gate resistance. The duty calculation unit 113 generates a voltage peak reference value 921 using the current detection signal 6112 and the DC voltage detection signal 5112, and adjusts a duty D which is a ratio of an ON period for each semiconductor switching element 4*i* (i=1 to 6) using a carrier frequency reference value 911 which is a repetition frequency of a PWM carrier wave determined by the driving condition setting unit 112. Then, the duty calculation unit 113 outputs the duty D, the carrier frequency reference value 911, and the voltage peak reference value 921. The voltage peak reference value 921 generated by the duty calculation unit 113 is used also in an operation waveform estimation unit 1121 of the driving condition setting unit 112, and the like. The gate signal output unit 114 outputs the gate signals 8*i*1 (i=1 to 6) for driving the respective semiconductor switching elements so as to satisfy the duty D, using the carrier frequency reference value 911 and the voltage peak reference value 921 from the duty calculation unit 113**.

Figure 3:
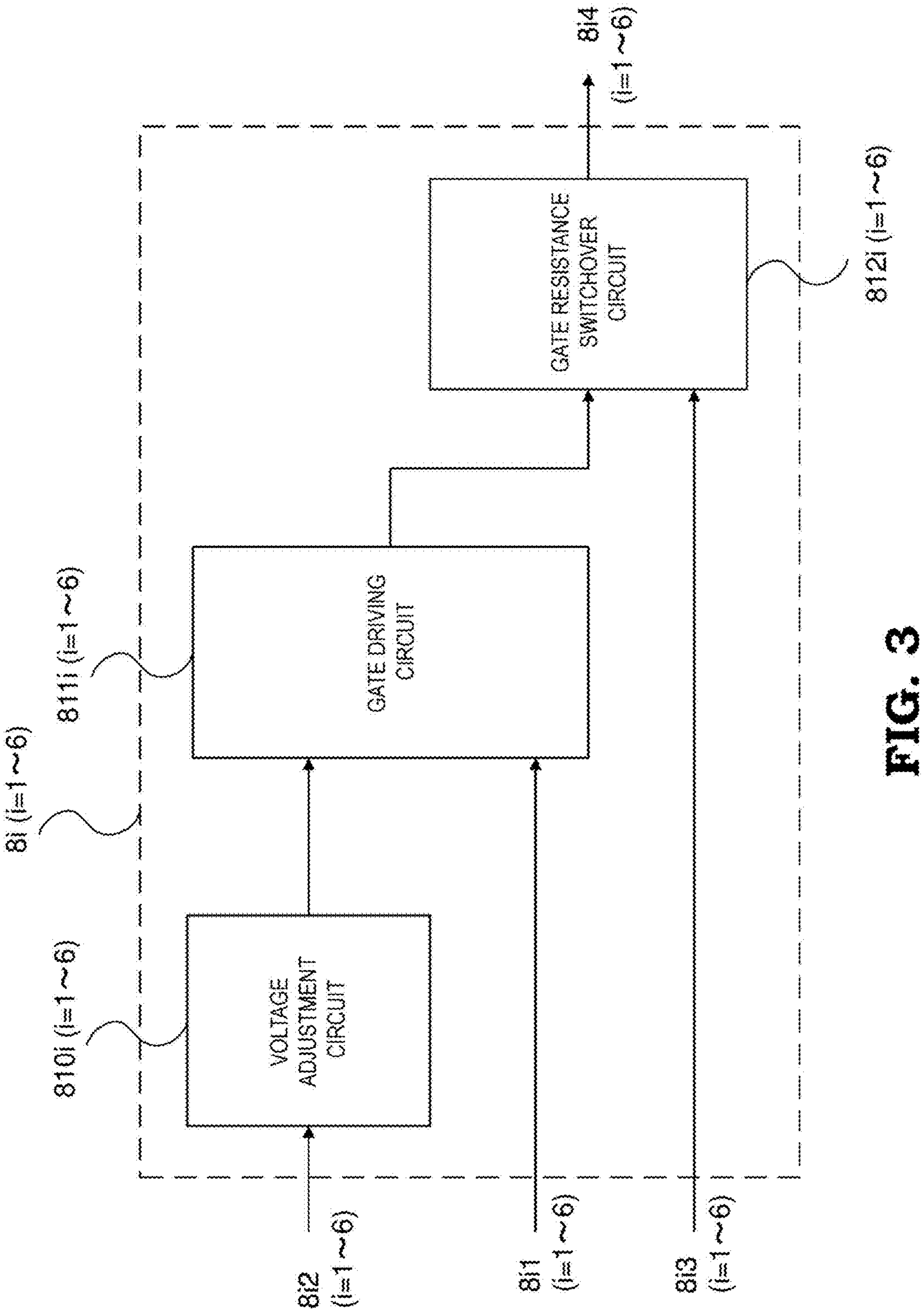
FIG. 3 is a block diagram showing the configuration of a gate driving unit of the power conversion device according to embodiment 1.

FIG. 3 is a block diagram showing the configuration of each gate driving unit 8*i* (i=1 to 6) for driving the gate of the semiconductor switching element 4*i* (i=1 to 6). The gate driving units 8*i* (i=1 to 6) have the same configuration. Each gate driving unit 8*i* (i=1 to 6) receives the gate signal 8*i*1 (i=1 to 6), the gate voltage reference value 8*i*2 (i=1 to 6), and the gate resistance reference value 8*i*3 (i=1 to 6), and outputs the gate voltage signal 8*i*4 (i=1 to 6), to drive the semiconductor switching element 4*i* (i=1 to 6). A voltage adjustment circuit 810*i* (i=1 to 6) receives the gate voltage reference value 8*i*2 (i=1 to 6) and the gate voltage value at present, and provides an output with the gate voltage value matched to the reference value through feedback control, for example. A gate driving circuit 811*i* (i=1 to 6) amplifies the gate signal 8*i*1 (i=1 to 6) to the gate voltage reference value set in the voltage adjustment circuit 810*i* (i=1 to 6), and outputs the resultant signal to a gate resistance switchover circuit. A gate resistance switchover circuit 812*i* (i=1 to 6) is a circuit for selecting a gate resistance value from predetermined gate resistance candidates in accordance with the gate resistance reference value 8*i*3 (i=1 to 6), and sets the gate resistance to the selected gate resistance value and thereby outputs the gate voltage signal 8*i*4 (i=1 to 6) based on the gate voltage reference value 8*i*2 (i=1 to 6) inputted from the gate driving circuit 811*i* (i=1 to 6). In FIG. 1, the configuration in which the gate driving units 8*i* (i=1 to 6) are provided outside the driving controller 11 is shown. However, the gate driving units 8*i* (i=1 to 6) or a part of each gate driving unit 8*i* (i=1 to 6) may be provided in the driving controller 11.

Figure 4:
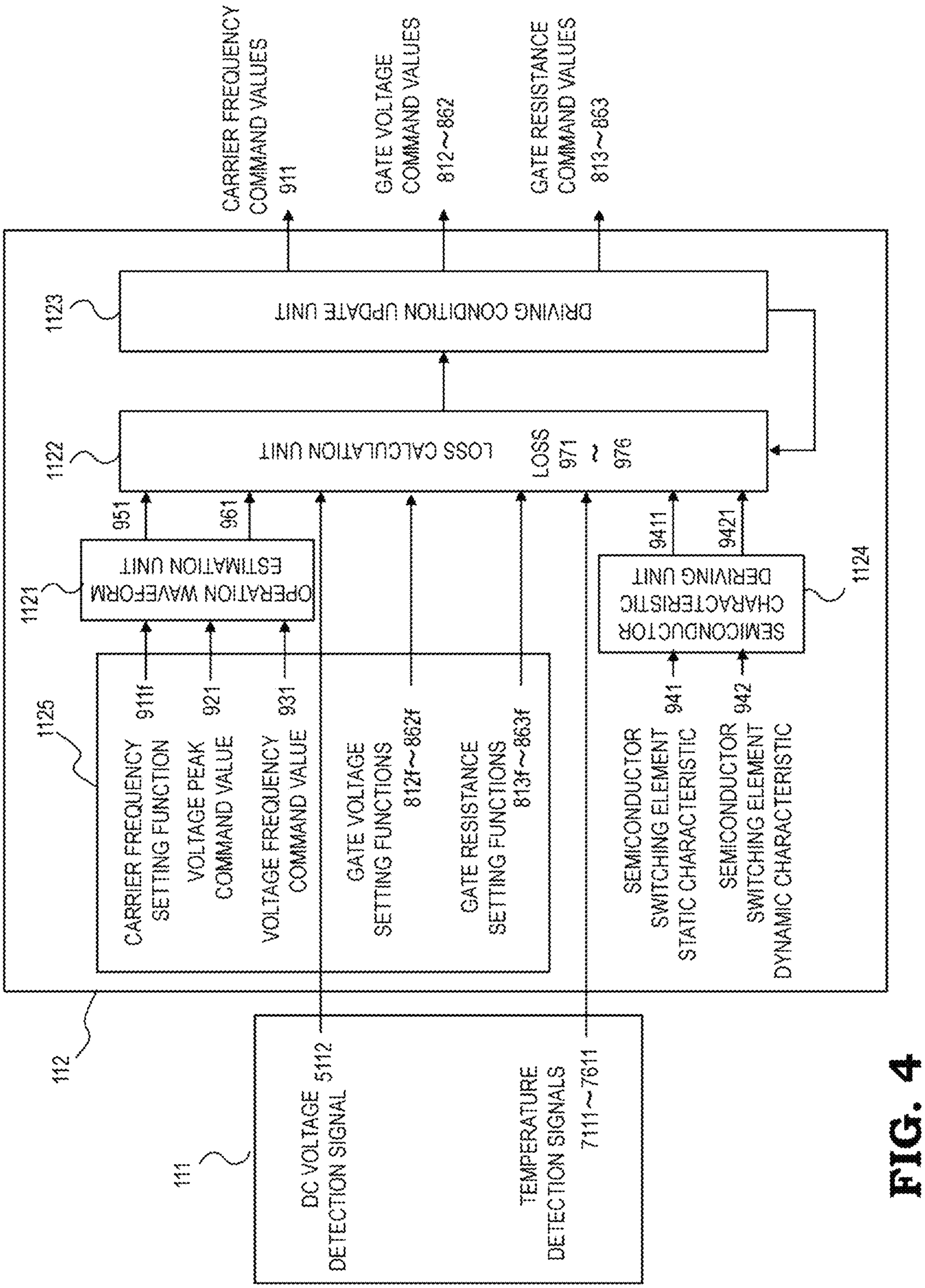
FIG. 4 is a block diagram showing the configuration of a driving condition setting unit of the power conversion device according to embodiment 1.

FIG. 4 is a block diagram showing the configuration of the driving condition setting unit 112. In the driving condition setting unit 112, the carrier frequency, the gate voltage, and the gate resistance which are the driving conditions are set as functions in one AC cycle. The functions are referred to as setting functions. The driving condition setting unit 112 receives a carrier frequency setting function 911*f* (hereinafter, a parameter that is a function is suffixed with a character "f"), gate voltage setting functions 8*i*2*f* (i=1 to 6) and gate resistance setting functions 8*i*3*f* (i=1 to 6) for the respective semiconductor switching elements, the voltage peak reference value 921, and the voltage frequency reference value 931 at present, receives a semiconductor switching element static characteristic 941 and a semiconductor switching element dynamic characteristic 942 which are stored in a memory, and receives the temperature detection signals 7*i*11 (i=1 to 6) for the respective semiconductor switching elements and the DC voltage detection signal 5112 converted by the AD conversion unit 111.

A setting value reading unit 1125 reads the carrier frequency setting function 911*f*, the gate voltage setting functions 8*i*2*f* (i=1 to 6) and the gate resistance setting functions 8*i*3*f* (i=1 to 6) for the respective semiconductor switching elements, the voltage peak reference value 921, and the voltage frequency reference value 931 at present. The operation waveform estimation unit 1121 estimates a gate signal pattern 951 and an operation current waveform 961 for one cycle of the voltage frequency reference value 931. A semiconductor characteristic deriving unit 1124 reads the semiconductor switching element static characteristic 941 and the semiconductor switching element dynamic characteristic 942 which are stored as data in the memory in advance. From the stored semiconductor switching element static characteristic and dynamic characteristic, a semiconductor switching element conduction loss characteristic 9411 and a semiconductor switching element switching loss characteristic 9421 are generated as approximation expressions or approximation data that depend on five variables which are an applied voltage, a flowing current, a gate resistance, a gate voltage, and a temperature of each semiconductor switching element.

The semiconductor switching element static characteristic 941 on the input side of the semiconductor characteristic deriving unit 1124 is given as characteristic data of forward-direction voltage drop and reverse-direction voltage drop with a flowing current, a temperature, and a gate voltage as parameters, about a target semiconductor switching element. The semiconductor switching element dynamic characteristic 942 is given as characteristic data of turn-on loss (loss when a semiconductor switching element is turned on) and turn-off loss (loss when a semiconductor switching element is turned off) with a flowing current, a temperature, a gate voltage, a gate resistance, and a DC applied voltage as parameters, about a target semiconductor switching element.

In the semiconductor characteristic deriving unit 1124, using the inputted semiconductor switching element static characteristic 941, the semiconductor switching element conduction loss characteristic 9411 is generated as an approximation expression or approximation data with a gate voltage, a junction temperature, and a flowing current as parameters. In addition, using the inputted semiconductor switching element dynamic characteristic 942, the semiconductor switching element switching loss characteristic 9421 is generated as an approximation expression or approximation data with a gate voltage, a gate resistance, a junction temperature, a DC applied voltage, and a flowing current as parameters. The semiconductor switching element conduction loss characteristic 9411 and the semiconductor switching element switching loss characteristic 9421 to be generated as approximation expressions or approximation data may be generated outside and may be stored in a memory. In this case, the semiconductor characteristic deriving unit 1124 can be omitted.

Then, a loss calculation unit 1122 applies the gate signal pattern 951 and the operation current waveform 961 outputted from the operation waveform estimation unit 1121, the DC voltage detection signal 5112 and the temperature detection signals 7*i*11 (i=1 to 6) for the respective semiconductor switching elements outputted from the AD conversion unit 111, the gate voltage setting functions 8*i*2*f* (i=1 to 6), and the gate resistance setting functions 8*i*3*f* (i=1 to 6), to the semiconductor switching element conduction loss characteristic 9411 and the semiconductor switching element switching loss characteristic 9421 outputted from the semiconductor characteristic deriving unit 1124, thereby obtaining loss 97*i* which is the sum of conduction loss and switching loss of each semiconductor switching element 4*i* (i=1 to 6) in one cycle of the voltage frequency reference value 931, i.e., one AC cycle, through calculation. As one of the parameters set for the semiconductor switching element characteristics, the junction temperature is used, and the junction temperature for each semiconductor switching element can be estimated from the temperature detection signal 7*i*11 (i=1 to 6). Although loss in one AC cycle is calculated in the above description, loss in two AC cycles may be calculated, for example, and loss in a loss calculation period set in advance may be calculated. Preferably, the loss calculation period is a period of at least one AC cycle.

A driving condition update unit 1123 updates the setting functions for the carrier frequency, the gate voltage, and the gate resistance, to such setting functions that reduce loss. Therefore, while the setting functions for the carrier frequency, the gate voltage, and the gate resistance are changed, the loss calculation unit 1122 repeats processing of calculating loss based on the changed setting functions for the carrier frequency, the gate voltage, and the gate resistance, thereby determining such setting functions for the carrier frequency, the gate voltage, and the gate resistance that semiconductor switching element loss is small. On the basis of the determined setting functions, the driving condition update unit 1123 outputs the carrier frequency reference value 911, the gate voltage reference values **8*i*2 (i=1 to 6), and the gate resistance reference values 8*i*3** (i=1 to 6). These reference values are outputted as values of the setting functions corresponding to the phase of AC at this point of time, in every period of Tsw described later, for example.

Figure 5:
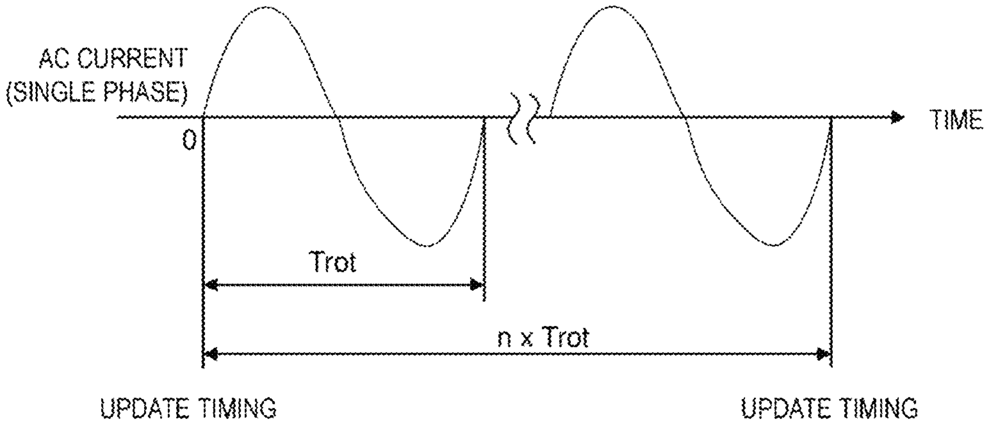
FIG. 5 illustrates update timings for driving conditions in the driving condition setting unit of the power conversion device according to embodiment 1.

FIG. 5 shows update timings of updating the setting functions for the carrier frequency, the gate voltage, and the gate resistance which are the driving conditions, in the driving condition setting unit 112, in relation with the AC cycle. As shown in FIG. 5, in the present embodiment, one cycle of a sinewave current for one phase flowing through the motor 21 connected to the AC side of the inverter is a period Trot as a base for update, and processing for updating the driving conditions is executed in cycles of an integer multiple (n times) of Trot. After processing for updating the driving conditions is executed, operation is performed with the semiconductor switching elements driven during a period (hereinafter, may be referred to as a predetermined driving period) that is n times Trot under the updated driving conditions.

Figure 6:
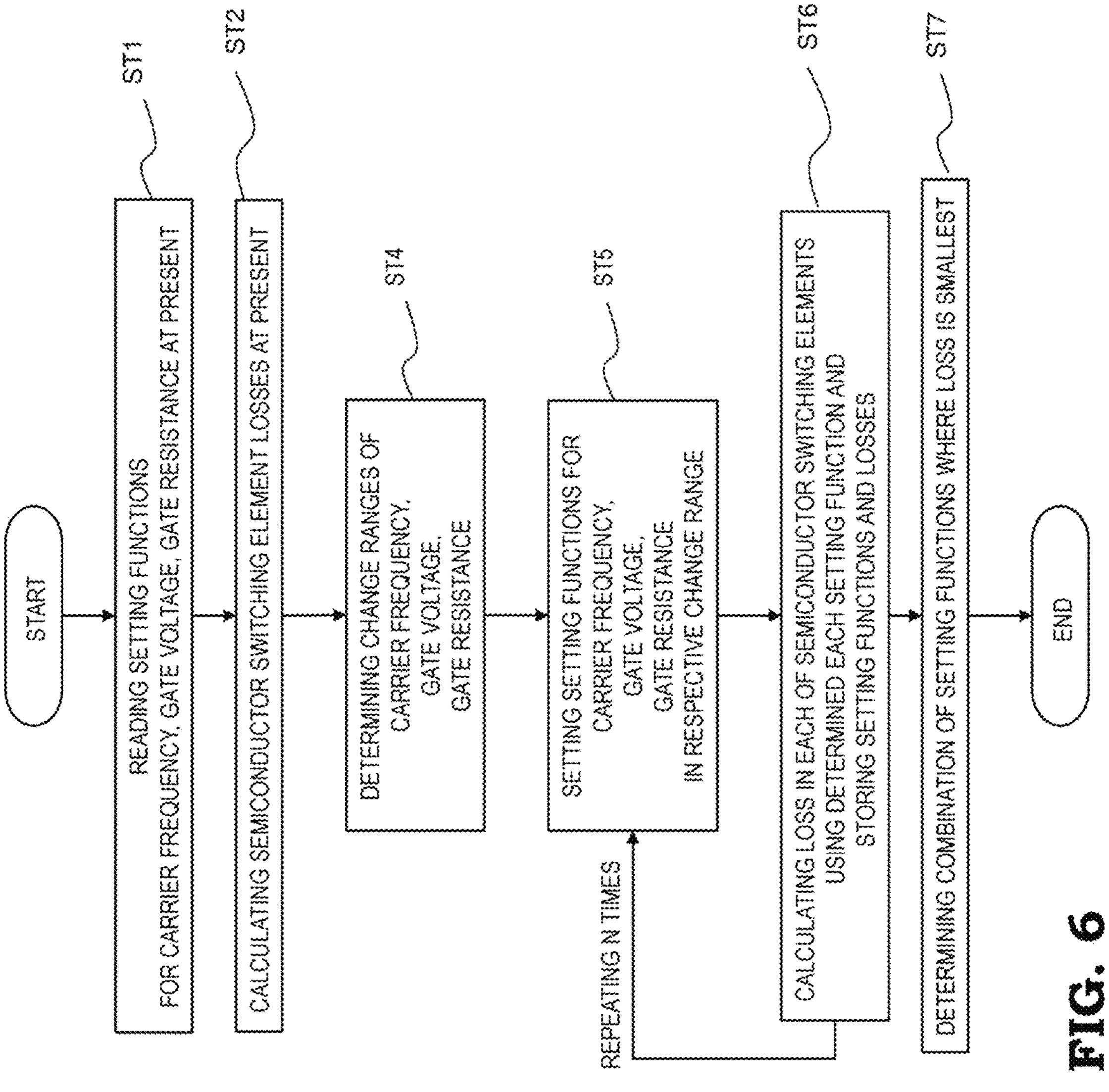
FIG. 6 shows a processing flow for updating the driving conditions in the driving condition setting unit of the power conversion device according to embodiment 1.

FIG. 6 is a flowchart showing a process in the driving condition setting unit 112 described in FIG. 4. The process in FIG. 6 is executed at the update timings shown in FIG. 5. That is, the process in FIG. 6 is executed at the update timings, to determine and update the setting functions for the carrier frequency, the gate voltage, and the gate resistance in one AC cycle Trot. The setting functions may be set as functions in a period of at least one AC cycle, and may be set as functions in a period of two AC cycles, for example, or may be set as functions in a longer period. In the following description, as an example, it is assumed that the setting functions are set as functions in a period of one AC cycle.

First, the setting functions for the carrier frequency, the gate voltage, and the gate resistance at present are read (step ST1). Using the setting functions, loss in each semiconductor switching element 41 to 46 in one AC cycle is calculated as semiconductor switching element loss at present (step ST2).

The semiconductor switching element loss is obtained through calculation by applying the setting function **8*i*2*f* (i=1 to 6) for the gate voltage and the setting function 8*i*3*f* (i=1 to 6) for the gate resistance at present which are stored in the memory, the gate signal pattern 951 and the operation current waveform 961 outputted from the operation waveform estimation unit 1121, the temperature detection signal 7*i*11 (i=1 to 6) for each semiconductor switching element, and the DC voltage detection signal 5112, to the semiconductor switching element conduction loss characteristic 9411 and the semiconductor switching element switching loss characteristic 9421**.

Figure 7:
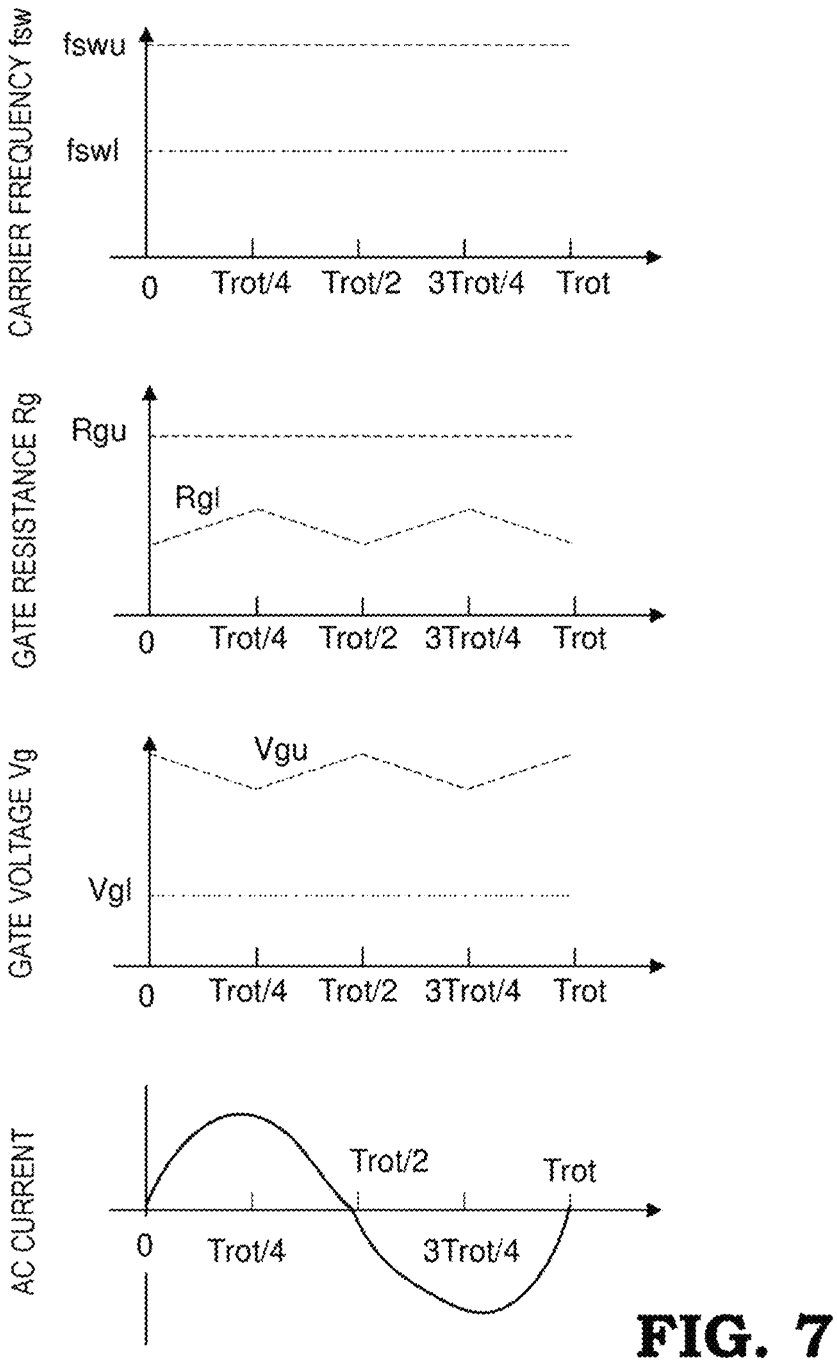
FIG. 7 shows examples of change ranges of the respective driving conditions in the driving condition setting unit of the power conversion device according to embodiment 1.

Next, in step ST4, a change range of the carrier frequency, a change range of the gate voltage, and a change range of the gate resistance for determining the setting functions for the carrier frequency, the gate voltage, and the gate resistance to be updated, are determined. These change ranges are ranges to be determined so that the setting functions for the respective parameters are within the change ranges, and are determined as functions of an upper limit value and a lower limit value in one AC cycle. FIG. 7 shows examples of the change ranges of a carrier frequency fsw, a gate resistance Rg, and a gate voltage Vg.

As the change range of the carrier frequency fsw, an upper limit value fswu and a lower limit value fswl are determined by constraints different from those for loss calculation, e.g., a control characteristic, a processing speed of a CPU for control, and the like. An upper limit value Rgu of the gate resistance Rg is determined mainly from the element withstand voltage and a lower limit value Rgl thereof is determined mainly from a surge voltage of the semiconductor switching element, for example, thus being determined by constraints different from those for loss. An upper limit value Vgu of the gate voltage Vg is determined from constraints due to a surge voltage and a lower limit value Vgl thereof is determined from a saturation characteristic of the semiconductor switching element, thus being determined by constraints different from those for loss.

Next, the setting functions for the carrier frequency, the gate voltage, and the gate resistance are set in the change range (fswu−fswl) of the carrier frequency, the change range (Vgu−Vgl) of the gate voltage, and the change range (Rgu−Rgl) of the gate resistance, respectively (ST5).

Figure 8A:
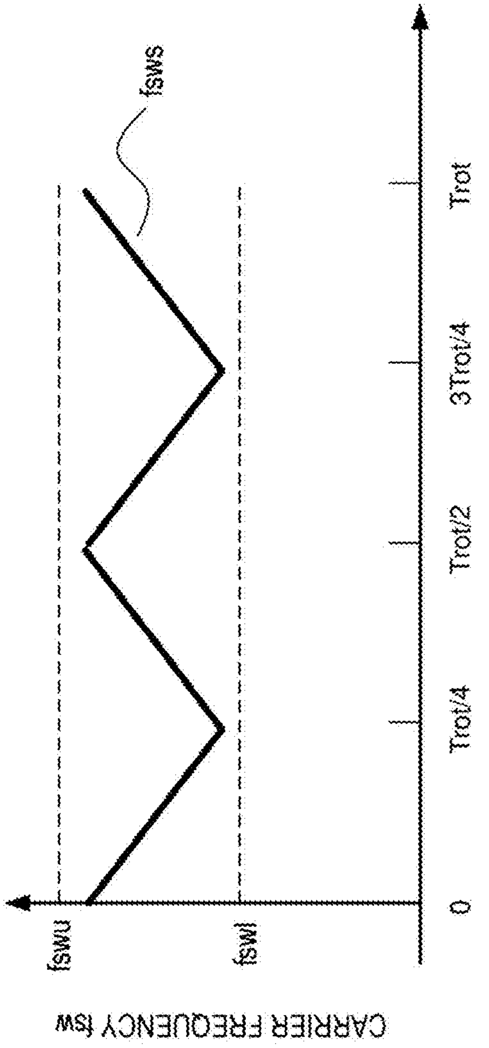
FIG. 8A and FIG. 8B show examples of a setting function for a carrier frequency in the driving condition setting unit of the power conversion device according to embodiment 1.
Figure 8B:
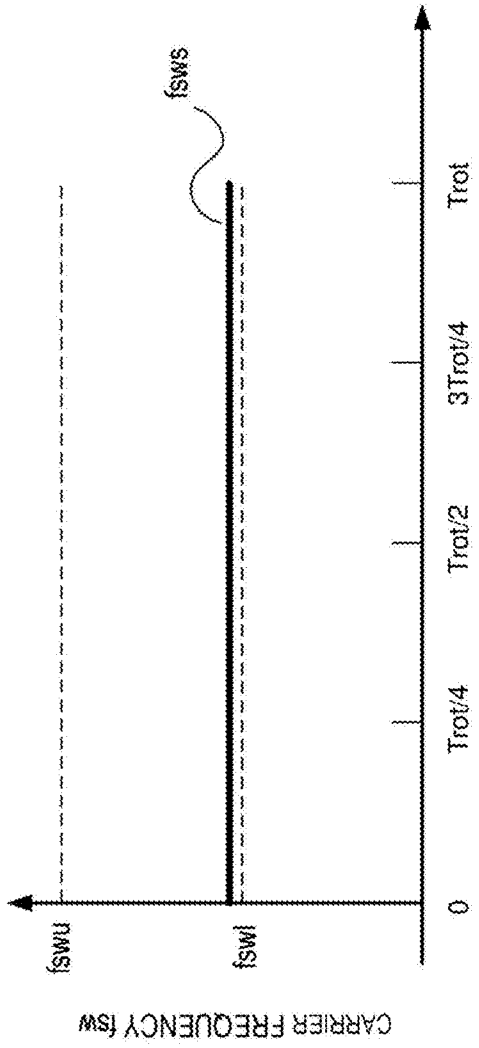

FIG. 8A and FIG. 8B show examples of a setting function fsws for the carrier frequency fsw. A thick line represents the setting function fsws. FIG. 8A shows such an example of the setting function fsws that the frequency is linearly reduced toward a phase (Trot/4, 3Trot/4) at which the output current becomes a peak, so as to reduce switching loss. FIG. 8B shows such an example of the setting function fsws that has a constant value without change in the setting value. It is also possible that the setting value is not changed even at an update timing, and with the carrier frequency changed at an update timing, the carrier frequency may be kept constant at the setting value during one AC cycle (period of Trot). In addition, the carrier frequency may be changed stepwise in one AC cycle.

Figure 9A:
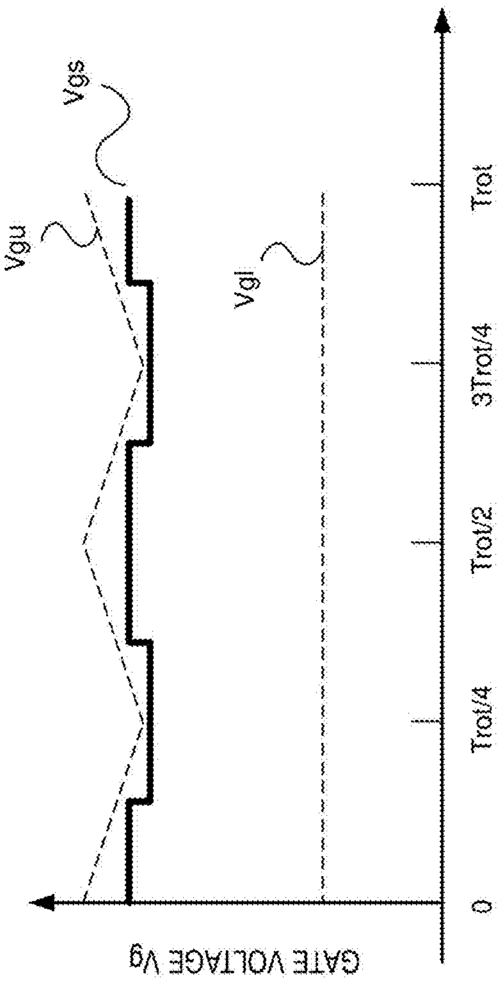
FIG. 9A and FIG. 9B show examples of a setting function for a gate voltage in the driving condition setting unit of the power conversion device according to embodiment 1.
Figure 9B:
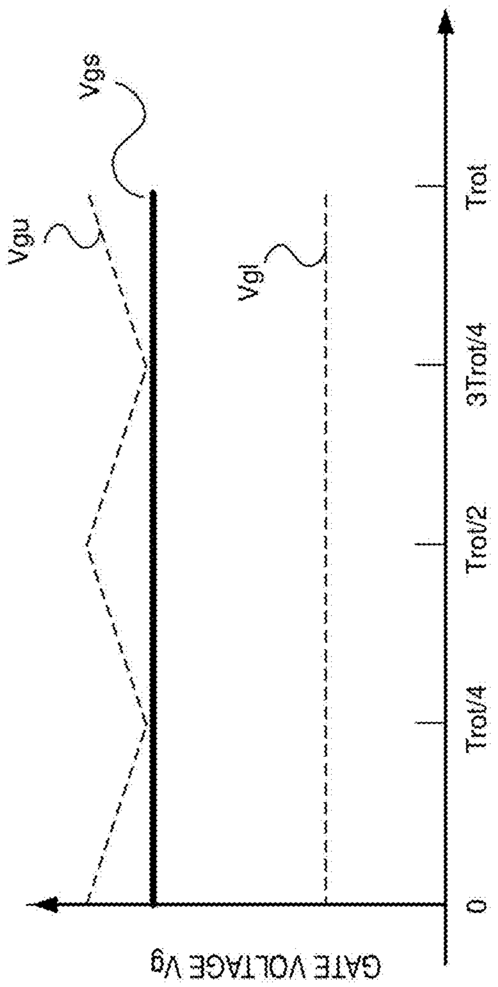

FIG. 9A and FIG. 9B show examples of the setting function for the gate voltage Vg. A thick line represents a setting function Vgs. FIG. 9A shows an example in which the setting function Vgs is determined such that the gate voltage is reduced around a phase (Trot/4, 3Trot/4) at which the output current becomes a peak. In this setting, considering that a surge voltage increases as a switching current increases, the gate voltage is reduced in a predetermined period so as to keep a surge voltage under an allowable voltage value. FIG. 9B shows an example in which the function is set at a constant value. It is also possible that the setting value is not changed even at an update timing, and with the gate voltage changed only at an update timing, the gate voltage may be kept constant at the setting value during one AC cycle (period of Trot). Switchover of the gate voltage requires a response time via a capacitor load, and therefore the gate voltage is changed stepwise, instead of being changed in a ramp manner.

Figure 10A:
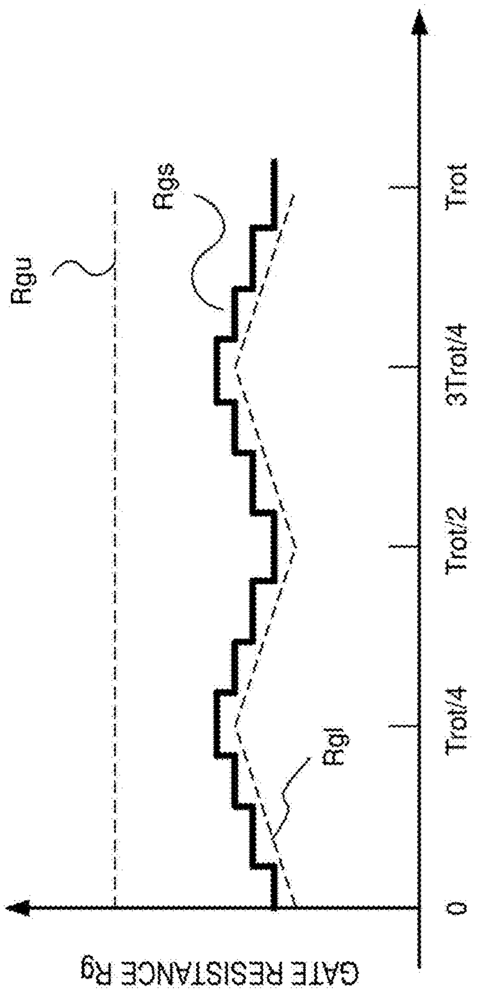
FIG. 10A and FIG. 10B show examples of a setting function for a gate resistance in the driving condition setting unit of the power conversion device according to embodiment 1.
Figure 10B:
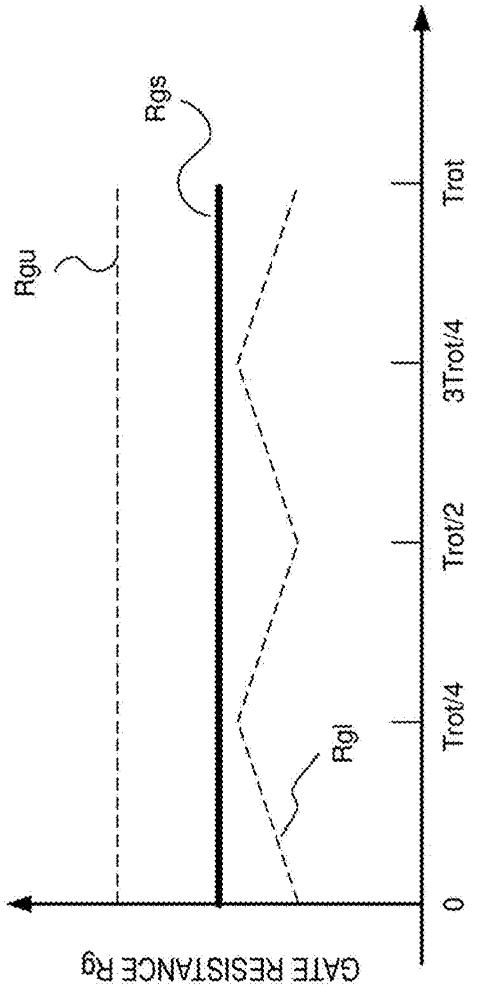

FIG. 10A and FIG. 10B show examples of a setting function Rgs for the gate resistance Rg. FIG. 10A shows such an example of the setting function Rgs that is changed in accordance with the phase. In this example, the setting function Rgs is set such that the gate resistance is increased around a phase (Trot/4, 3Trot/4) at which the output current becomes a peak. In this setting, considering that a surge voltage increases as a switching current increases, the gate resistance is increased in every predetermined period so as to keep a surge voltage under an allowable voltage value. Meanwhile, since switching loss increases as the gate resistance increases, the setting function Rgs is set such that the gate resistance is made as small as possible in the constraint range for a surge voltage. FIG. 10B shows an example in which the function is set at a constant value. It is also possible to set the setting function Rgs such that the setting value is not changed even at an update timing, and with the gate resistance value changed at an update timing, the setting function Rgs may be kept constant at the setting value during one AC cycle (period of Trot). Each gate resistance switchover circuit 812*i* (i=1 to 6) is configured to switch a fixed resistance value by a switch or the like. Therefore, switchover of the gate resistance value is performed stepwise, instead of being performed in a ramp manner.

Using the setting functions for the carrier frequency, the gate voltage, and the gate resistance determined as described above, loss in each of the semiconductor switching elements 41 to 46 is calculated and stored (step ST6). Step ST5 and step ST6 are repeated a predetermined number of times (N times). That is, (N+1) patterns of combinations of the setting function for the carrier frequency, the setting function for the gate voltage, and the setting function for the gate resistance and losses in the semiconductor switching element, including those set at present, are stored. A combination of the setting function for the carrier frequency, the setting function for the gate voltage, and the setting function for the gate resistance where the loss is smallest among the (N+1) losses, is determined (step ST7), and the semiconductor switching elements 41 to 46 are driven on the basis of these setting functions.

As described above, a combination of the setting functions that minimizes the loss can be obtained from a wide variety of combinations of the setting functions set in the change ranges of the carrier frequency, the gate voltage, and the gate resistance determined in step ST4. Thus, even if the current and voltage condition on the AC side, the voltage on the DC side, or the like is changed, the driving conditions, including the gate voltage and the gate resistance, where semiconductor switching element loss is reduced can be set, whereby the power conversion device having reduced loss can be provided.

As described above, the carrier frequency, the gate voltage, and the gate resistance are set as setting functions in one AC cycle, i.e., functions of the phase of AC. From the driving controller 11, the gate signals 8*i*1 (i=1 to 6), the gate voltage reference values 8*i*2 (i=1 to 6), and the gate resistance reference values 8*i*3 (i=1 to 6), are outputted as values based on the setting functions at each phase of the AC. For example, in every cycle of the carrier frequency, i.e., every basic pulse of PWM control, the gate signals 8*i*1 (i=1 to 6), the gate voltage reference values 8*i*2 (i=1 to 6), and the gate resistance reference values 8*i*3 (i=1 to 6) are outputted from the driving controller 11, and the gate voltage signals 8*i*4 (i=1 to 6) based on the above values are applied from the gate driving units 8*i* (i=1 to 6) to the gates of the respective semiconductor switching elements 4*i* (i=1 to 6), whereby the semiconductor switching elements 4*i* (i=1 to 6) are driven.

In a case where a value is changed stepwise in one AC cycle as in the setting function Vgs for the gate voltage in FIG. 9A or the setting function Rgs for the gate resistance in FIG. 10A, a time point (indicated by a black circle) of a crest or a trough of a PWM carrier wave shown in FIG. 11 is set as a timing of change. That is, the cycle in which the value is changed stepwise may be set to be longer than one cycle (Tsw in FIG. 11) of the PWM carrier wave, and the timing of change may be set to be a time point of a crest or trough of the carrier wave.

In FIG. 11, the case where the timing of change is synchronized with a crest or a trough of the PWM carrier wave has been shown. However, the timing of change may be set at any phase of the PWM carrier wave. While a change cycle is determined by performance on the controller side, change cycles of the carrier frequency, the gate voltage, and the gate resistance may be set to be longer than one cycle of the PWM carrier wave and the timings of changes may be set to be a time point of the same phase of the carrier wave.

Regarding stepwise change cycles of the gate voltage, the gate resistance, and the carrier frequency, when a reference value for the gate voltage is changed, the gate voltage value of the gate driving unit shown in FIG. 1 is changed. However, a smoothing capacitor is necessarily provided at a part where the gate voltage is applied. Due to the capacitance of the smoothing capacitor, change in the gate voltage is delayed relative to stepwise change in the reference value. In particular, if the capacitance of the capacitor is increased, a period of change in the gate voltage might become longer than a period of change in the carrier cycle. Meanwhile, change in the carrier frequency and change in the gate resistance are changes having no time constants. Therefore, in a case of changing the gate voltage stepwise, change may be performed in the AC cycle, i.e., a slow cycle, and meanwhile, the carrier frequency and the gate resistance may be changed in the carrier frequency, i.e., a fast cycle.

Regarding presence/absence of update of each setting function for the carrier frequency, the gate resistance, and the gate voltage shown in FIG. 8A to FIG. 10B, there are eight patterns as shown in a table in FIG. 12. Combination 1 is an operation mode in which update is not performed at all. A case of setting the setting functions in step ST4 corresponds to any of combinations 2 to 8. A case where the setting function is changed at an update timing and then the setting function is kept until the next update timing, is classified as YES.

For example, in combination 2, only the setting function for the carrier frequency is updated. That is, in step ST5, only the setting function for the carrier frequency is changed and the setting function for the gate voltage and the setting function for the gate resistance are not changed, and then loss is calculated in step ST6. Such processing is repeated N times, to determine the setting function for the carrier frequency that minimizes loss.

The carrier frequency is set from the standpoint of the control quality for the sinewave current of the inverter, and the gate voltage and the gate resistance are set from the standpoint of loss per one switching operation. On the basis of a difference between the standpoint of setting of the carrier frequency and the standpoint of setting of the gate voltage and the gate resistance, the driving condition update unit 1123 selects a combination of parameters to be updated, from the combinations in FIG. 12, whereby it is possible to find such driving conditions that make loss smaller than in a case where a parameter to be updated and set is the carrier frequency alone or only the gate resistance and the gate voltage.

Embodiment 2

In embodiment 1, the lower limit value of the gate resistance is set (1) in one AC cycle, (2) in accordance with the current value, and (3) under constraints due to the withstand voltage of the semiconductor switching element. For example, in a case of using a storage battery as the power supply on the DC side, it is assumed that the DC voltage changes over a much longer period than the cycle of AC. It is preferable that, in accordance with the DC voltage changing as described above, the lower limit value of the gate resistance is set in consideration of a surge voltage on the motor side, noise, and false turn-on of the semiconductor switching element.

In a case of considering a surge voltage on the motor side, not only the withstand voltage of the semiconductor switching element is considered, but also, since a surge voltage superimposed on the output voltage of the inverter via an output cable is applied to a motor input end, the surge voltage needs to be kept under a withstand voltage upper limit determined from the dielectric strength of the motor. In addition, in a case of reducing the gate resistance and increasing the switching speed, increase in noise, false turn-on (the semiconductor switching element is turned on against an OFF signal of the gate signal), or the like might occur, resulting in deterioration of reliability. Therefore, the switching speed needs to be controlled to be a certain speed or lower in advance. The switching speed determined from the semiconductor switching element and the surge voltage at the input end of the motor, and the switching speed determined from suppression of noise and false turn-on of the semiconductor switching element, depend on not only the sinewave current of the inverter but also the DC voltage.

Accordingly, in the present embodiment 2, in determination of the setting function for the gate resistance Rg described in embodiment 1, using the DC voltage and the output current as input information, the lower limit value Rgl of the gate resistance is determined in consideration of an upper limit of the switching speed determined by an allowable value of a surge voltage determined from the withstand voltage of the semiconductor switching element and an allowable value of a surge voltage determined from the withstand voltage at the input end of the motor, and in addition, an upper limit of the switching speed determined in advance for suppressing noise and false turn-on of the semiconductor switching element.

Figure 13:
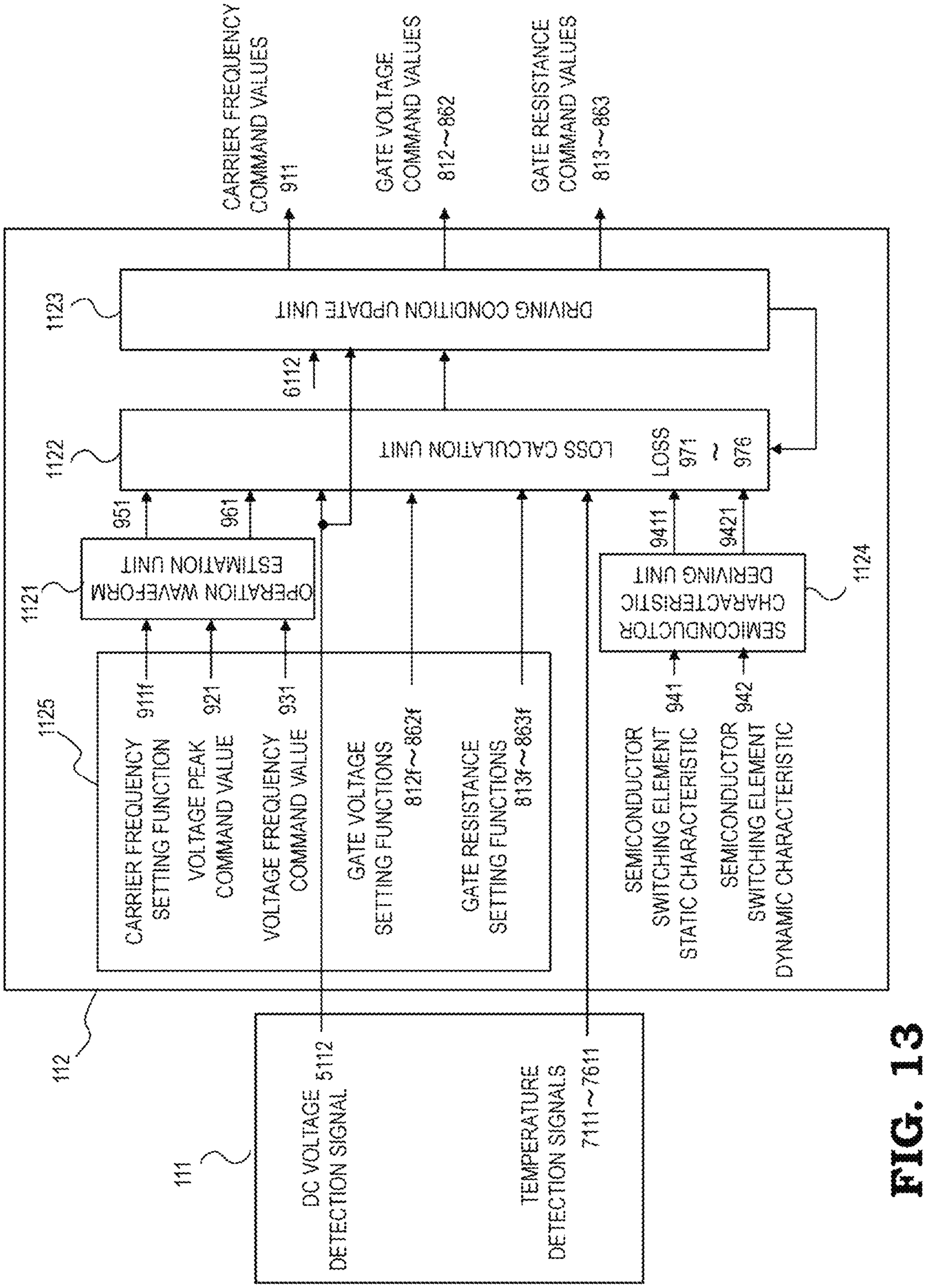
FIG. 13 is a block diagram showing the configuration of a driving condition setting unit of a power conversion device according to embodiment 2.

Update of the setting function for the gate resistance Rg is performed in the driving condition update unit 1123. Accordingly, as shown in FIG. 13, a configuration in which the DC voltage detection signal 5112 and the current detection signal 6112 are inputted to the driving condition update unit 1123 is adopted.

Figure 14:
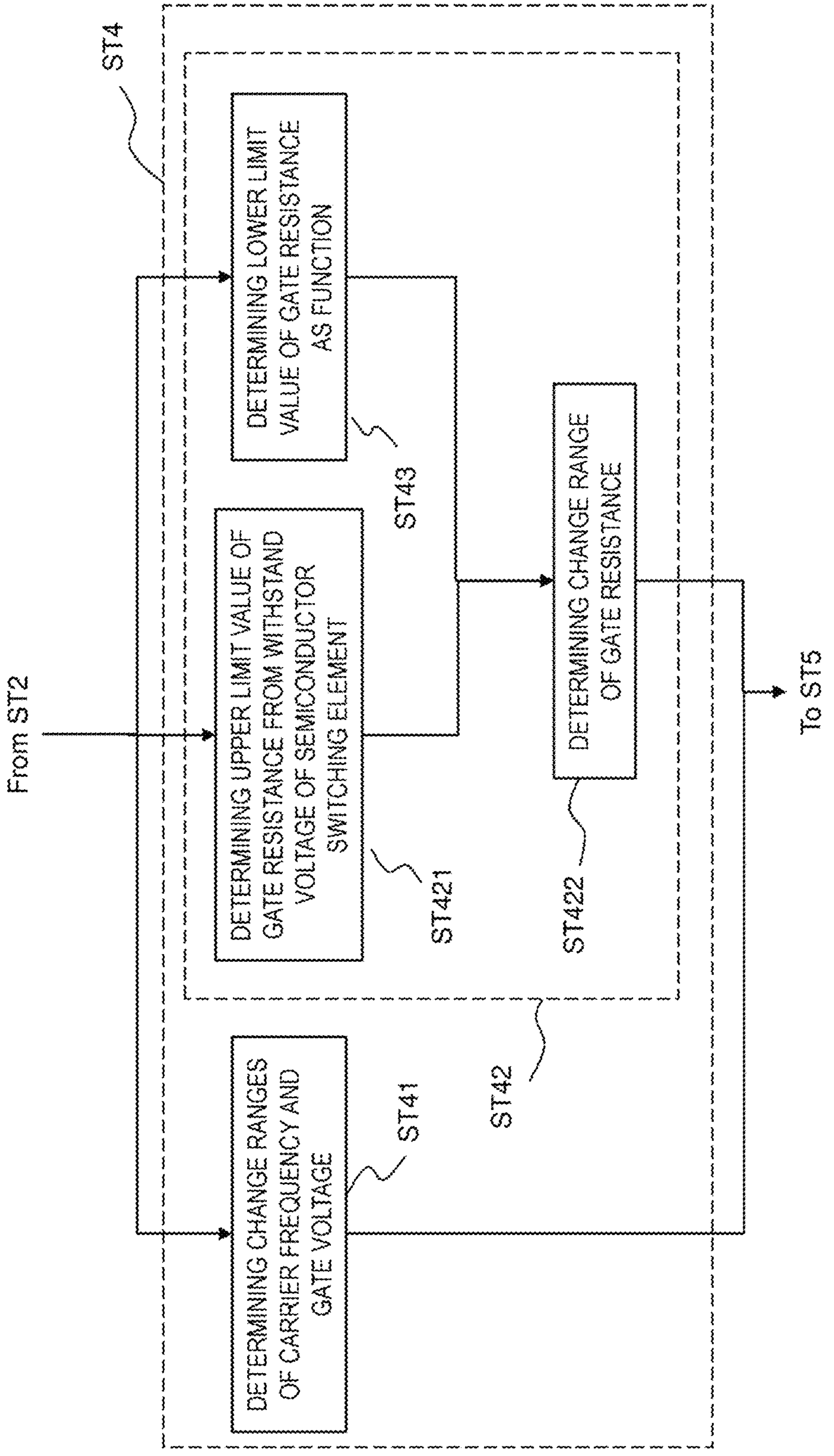
FIG. 14 shows a flow of step ST4 in a processing flow for updating driving conditions in the driving condition setting unit of the power conversion device according to embodiment 2.
Figure 15:
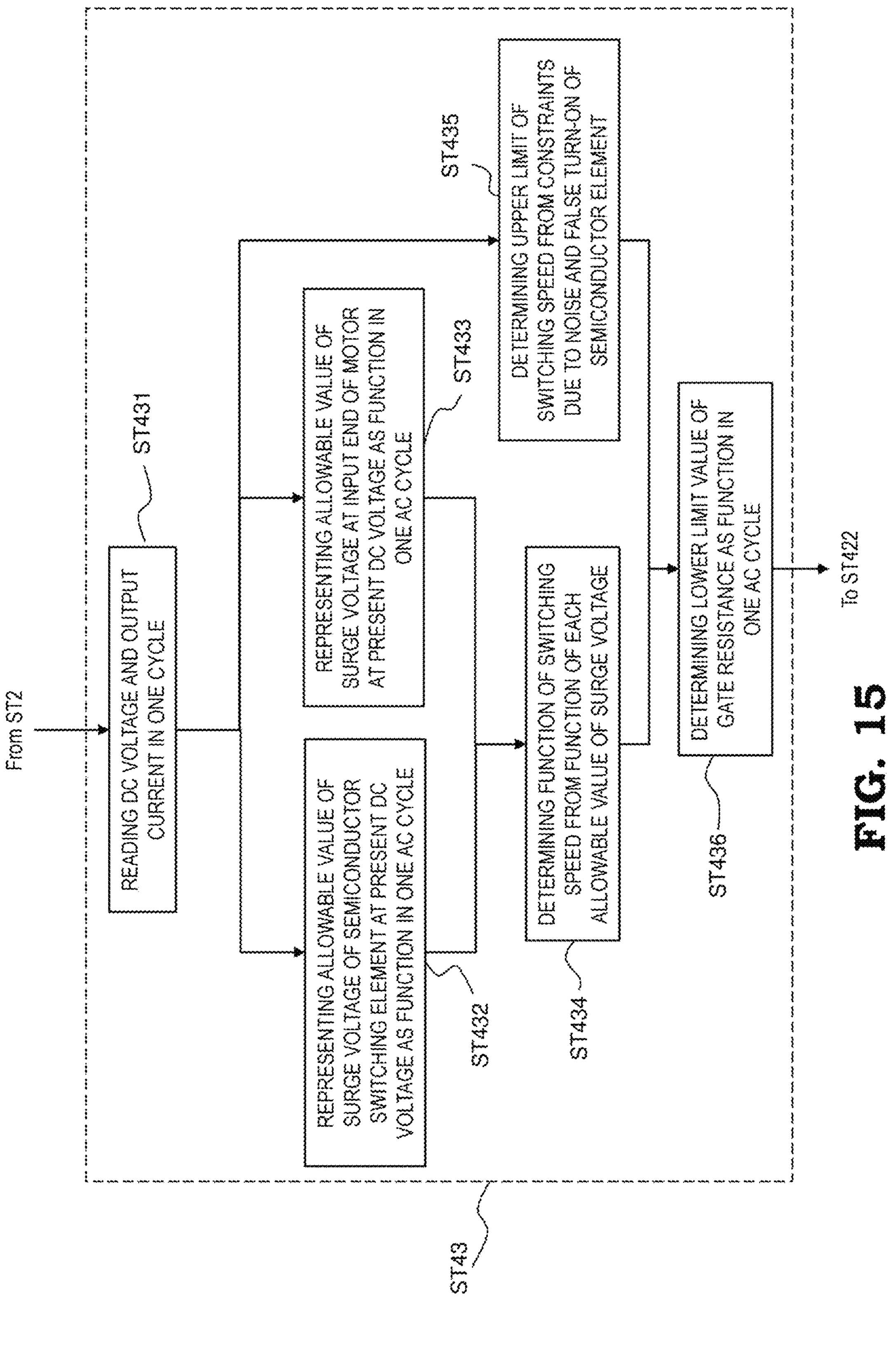
FIG. 15 shows a flow of step ST43 in the processing flow for updating the driving conditions in the driving condition setting unit of the power conversion device according to embodiment 2.

FIG. 14 and FIG. 15 are flowcharts showing determination of the change range of the gate resistance in the processing step ST4 in the driving condition update unit 1123 in the flowchart showing the process in the driving condition setting unit 112 described in FIG. 6. Here, the lower limit value of the change range of the gate resistance is determined in consideration of an upper limit of the switching speed determined by an allowable value of a surge voltage determined from the withstand voltage of the semiconductor switching element and an allowable value of a surge voltage determined from the withstand voltage at the input end of the motor, and in addition, an upper limit of the switching speed determined in advance for preventing noise and false turn-on. Steps ST1, ST2, ST5, ST6, and ST7 other than step ST4 are equivalent to those in FIG. 6. Therefore, the process is executed at the update timings shown in FIG. 5. That is, at the update timings, the process shown in FIG. 6 including the processing in step ST4 shown in FIG. 14 and FIG. 15 is executed, to determine and update the setting functions for the carrier frequency, the gate voltage, and the gate resistance in one AC cycle Trot.

Step ST4 is a step for determining the change range of the carrier frequency, the change range of the gate voltage, and the change range of the gate resistance, as in embodiment 1. Step ST41 for determining the change ranges of the carrier frequency and the gate voltage shown in FIG. 14 is the same as in embodiment 1. In the present embodiment 2, in step ST42 for determining the change range of the gate resistance, another condition is added to the condition described in embodiment 1. These change ranges are ranges to be determined so that the setting functions for the respective parameters are within the change ranges, and are determined as functions of an upper limit value and a lower limit value in a period of at least one AC cycle. As described in embodiment 1, the setting functions and the change ranges may be set as functions in a period longer than one AC cycle, instead of one AC cycle. In the following description, as an example, it is assumed that the setting functions and the change ranges are set as functions in a period of one AC cycle.

As shown in FIG. 14, in step ST42 for determining the upper limit value Rgu and the lower limit value Rgl of the gate resistance Rg, the upper limit value Rgu is determined mainly from the element withstand voltage of the semiconductor switching element (step ST421). FIG. 15 shows the detailed processing flow in step ST43 for determining the lower limit value Rgl of the gate resistance shown in FIG. 14. First, the DC voltage at present and the output current in one AC cycle are read (step ST431). The output current in one AC cycle is stored as a function with a phase as a parameter, for example. Next, an allowable value of a surge voltage in view of the DC voltage, the withstand voltage of the semiconductor switching element, and the output current is represented as a function in one AC cycle (step ST432). In addition, an allowable value of a surge voltage in view of the DC voltage, the withstand voltage at the input end of the motor, and the output current is represented as a function in one AC cycle (step ST433).

From the above functions of the allowable values of the surge voltages, the one having the smaller allowable value of the surge voltage is selected at each phase in one AC cycle, to determine the function of the allowable value of the surge voltage in one AC cycle, and the switching speed of the semiconductor switching element corresponding to the allowable value of the surge voltage is an upper limit of the switching speed. This switching speed is determined as a function in one AC cycle (step ST434). Here, a switching speed di/dt1 allowed from the allowable value of the surge voltage is calculated on the basis of the following formula. A surge voltage absolute value (a value obtained by superimposing the surge voltage on the DC voltage) is denoted by Vsurge, the DC voltage is denoted by Vdc, and a parasitic inductance is denoted by L. For the parasitic inductance L, a value actually measured in advance at the time of installation is employed as a constant.

$$di/dt1 = (Vsurge - Vdc)/L \qquad \text{Formula (1)}$$

Meanwhile, an upper limit di/dt2 of the switching speed is determined from constraints due to noise and false turn-on of the semiconductor switching element (step ST435). The upper limit of the switching speed is determined by constraints due to false turn-on of the semiconductor switching element and noise corresponding to peak values of the DC voltage and current at this point of time, for example.

Then, gate resistances corresponding to the function di/dt1 of the switching speed determined in step ST434 and the upper limit di/dt2 of the switching speed determined in step ST435 are calculated, both values are compared at each phase in one AC cycle, and the greater one is selected, to determine the lower limit value Rgl of the gate resistance as a function in one AC cycle (step ST436).

Here, in step ST434, from the functions of the allowable values of the surge voltages, functions of upper limits of the switching speeds corresponding to the respective allowable value functions may be determined, and in step ST436, the two functions of the upper limits of the switching speeds and the switching speed determined in step ST435, i.e., three values, may be compared at each phase, to determine the lower limit value of the gate resistance. At each phase, the smallest (slowest) switching speed is used as the upper limit of the switching speed, to obtain the function of the switching speed, and then the function of the gate resistance corresponding to the function of the switching speed is obtained, whereby the lower limit value of the gate resistance can be determined as a function in one AC cycle. Alternatively, first, functions of the gate resistances corresponding to the upper limits of the switching speeds may be calculated, and then at each phase, the greatest gate resistance value may be used as a lower limit value of the gate resistance at the phase, to determine a function of a lower limit value of the gate resistance in one AC cycle.

In any case, regarding the lower limit value of the change range of the gate resistance, from the upper limit of the switching speed of the semiconductor switching element determined by the allowable value of the surge voltage of the semiconductor switching element, the upper limit of the switching speed of the semiconductor switching element determined by the allowable value of the surge voltage of the motor, and the upper limit of the switching speed of the semiconductor switching element determined by constraints due to noise generated by the power conversion device and false turn-on of the semiconductor switching element, the gate resistance corresponding to the upper limit of the switching speed that is slowest is determined as the lower limit value at each phase of AC, whereby the lower limit value of the change range of the gate resistance can be determined as a function in one AC cycle.

Figure 16:
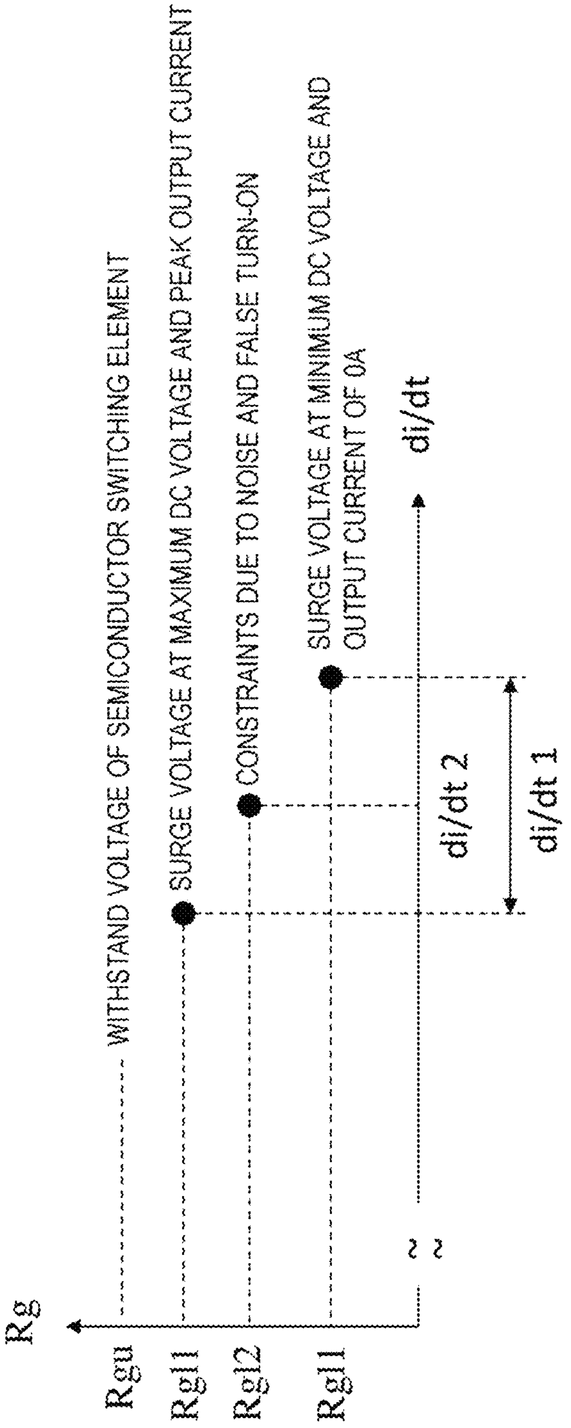
FIG. 16 illustrates a flow of step ST436 in the processing flow for updating the driving conditions in the driving condition setting unit of the power conversion device according to embodiment 2.
Figure 17:
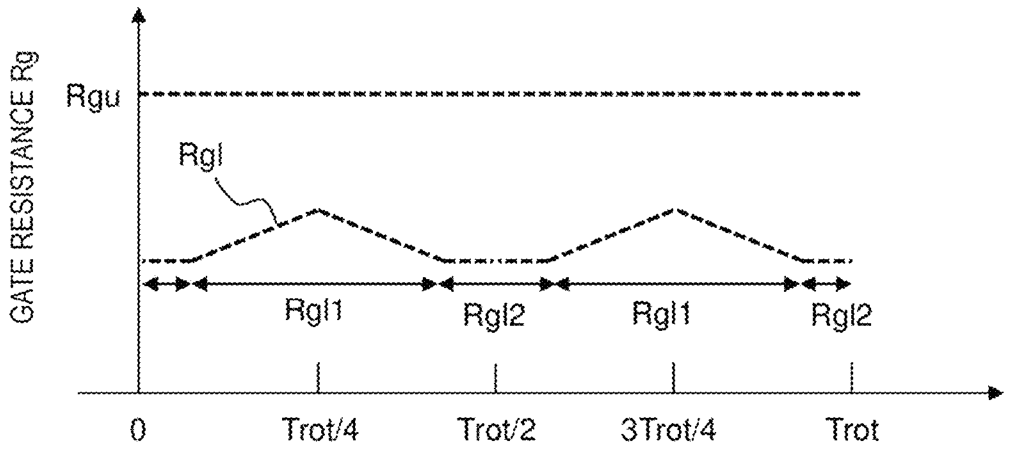
FIG. 17 shows an example of a change range of a gate resistance in the driving condition setting unit of the power conversion device according to embodiment 2.

FIG. 16 schematically shows the upper limit value Rgu and the lower limit values Rgl (Rgl1 and Rgl2) of the gate resistance. For the lower limit values Rgl, relationships with the switching speed di/dt are shown. The upper limit value Rgu of the gate resistance Rg is a value determined mainly from the element withstand voltage in step ST421. Rgl1 is a gate resistance value corresponding to di/dt1 calculated in step ST434. As shown in FIG. 16, the switching speed di/dt1 determined from the allowable value of the surge voltage changes in a range from a value when the DC voltage is maximum and the output current has a peak value to a value when the DC voltage is minimum and the output current is 0 A. Rgl2 is a gate resistance value corresponding to the switching speed di/dt2 determined from constraints due to noise and false turn-on in switching determined in step ST435. The DC voltage does not change enough to exhibit a significant difference during one AC cycle. Therefore, Rgl2, and Rgl1 corresponding to the output current which changes over one AC cycle, are compared at each phase, and the greater one at the phase is determined as Rgl at the phase. By determining Rgl over one AC cycle, the function of Rgl in one AC cycle can be determined. FIG. 17 shows examples of functions of the upper limit value Rgu and the lower limit value Rgl of the gate resistance in one AC cycle. In the example shown in FIG. 17, at a phase where the output current is small, Rgl2 is greater than Rgl1, and at a phase where the output current is great, Rgl1 is greater than Rgl2. Thus, the function takes Rgl2 as the value of Rgl at a phase where the output current is small, and takes Rgl1 as the value of Rgl at a phase where the output current is great.

The upper limit value Rgu of the gate resistance determined in step ST421 and the lower limit value Rgl of the gate resistance determined in step ST436 are set as the change range of the gate resistance Rg (step ST422). The setting function for the gate resistance is set so as to have a value in the change range (step ST5 in FIG. 6).

According to the present embodiment 2, dielectric breakdown of the motor, noise, and false turn-on of the semiconductor switching element can be suppressed, and loss reduction of the inverter can be achieved. In addition, by considering the DC voltage, it is possible to lower the lower limit value Rgl when the DC voltage is smaller than the maximum value (worst condition), whereby further loss reduction can be achieved. That is, in a case of not considering the DC voltage, the lower limit value Rgl of the gate resistance is fixed in a condition that maximizes the DC voltage, but by considering the DC voltage, when the DC voltage is small, Rgl can be made smaller than its value when the DC voltage is maximized. Thus, switching loss can be reduced as compared to switching loss in the condition that maximizes the DC voltage, whereby further loss reduction of the power conversion device can be achieved.

Embodiment 3

Figure 18:
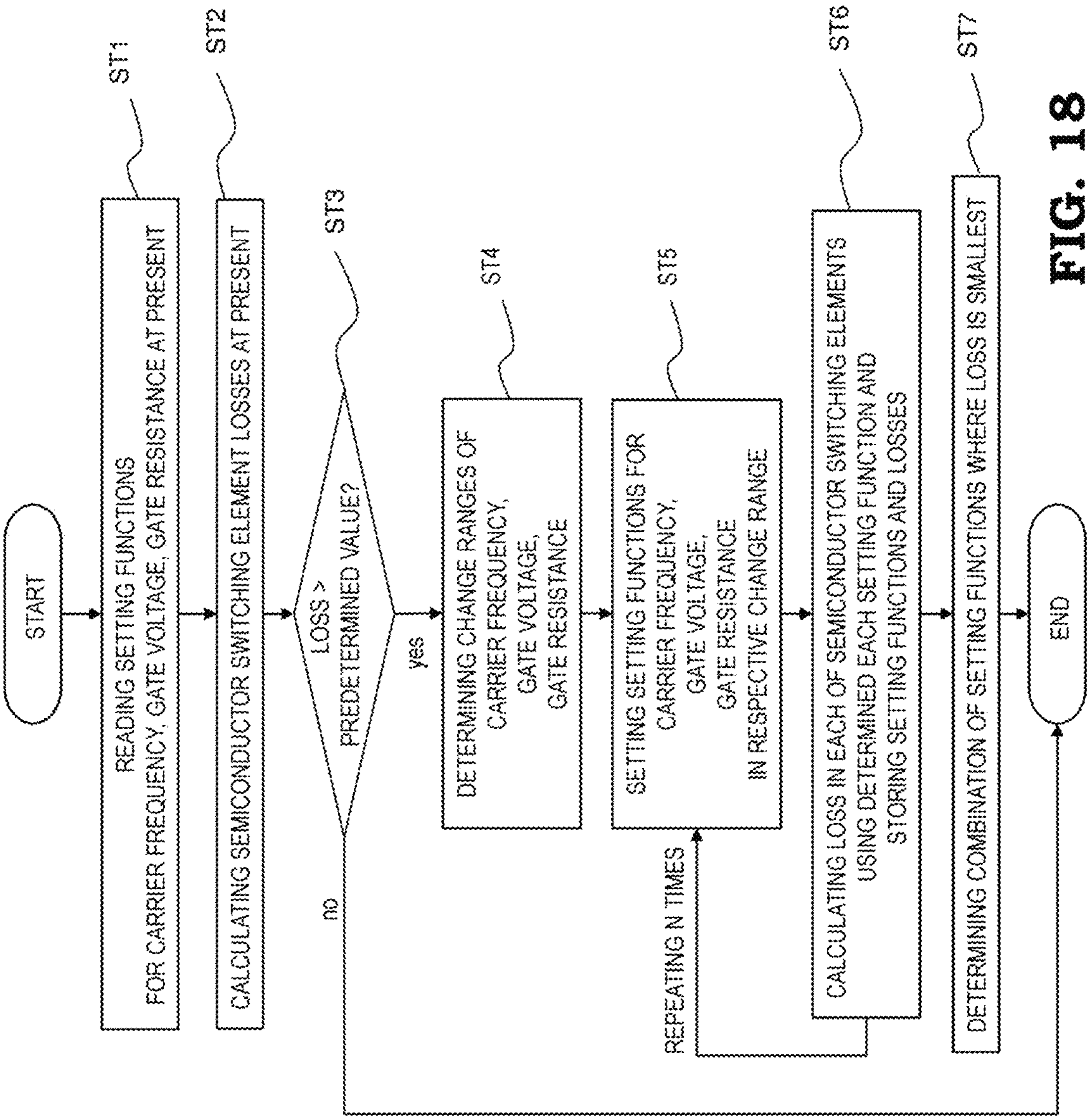
FIG. 18 shows a processing flow for updating driving conditions in a driving condition setting unit of a power conversion device according to embodiment 3.

FIG. 18 is a flowchart showing a process in the driving condition setting unit 112 of the power conversion device according to embodiment 3. In the processing flow shown in FIG. 18, determination processing in step ST3 is added between step ST2 and step ST4 in the processing flow in FIG. 6. That is, if loss calculated as the semiconductor switching element loss at present is a predetermined value or smaller (no in step ST3), driving is continued using the setting functions at present without updating the driving conditions. If the calculated loss is greater than the predetermined value (yes in step ST3), steps ST4 to ST7 are executed.

Thus, in a case where loss at present is small, unnecessary processing is not performed, so that the load on a calculation device for performing processing is reduced.

Figure 19:
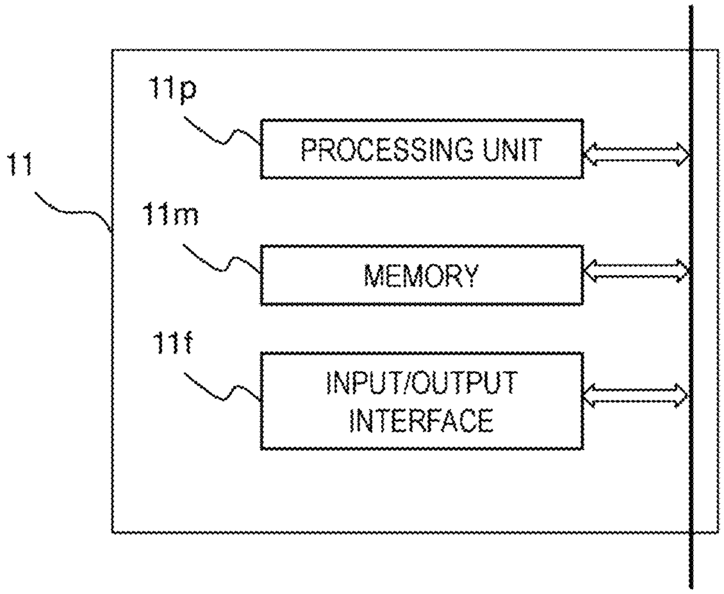
FIG. 19 shows an example of the hardware configuration of the driving controller.

The driving controller 11 shown in FIG. 2 includes, specifically, as shown in FIG. 19, a processing unit 11*p* such as a central processing unit (CPU), a memory 11*m* from/to which data is transferred to/from the processing unit 11*p*, an input/output interface 11*f* via which a signal is inputted/outputted between the processing unit 11*p* and the outside, and the like. As the processing unit 11*p*, an application specific integrated circuit (ASIC), an integrated circuit (IC), a digital signal processor (DSP), a field programmable gate array (FPGA), various signal processing circuits, and the like may be provided. As the processing unit 11*p*, the same kind of processing units or different kinds of processing units may be provided and execute each process in a shared manner. As the memory 11*m*, a random access memory (RAM) that allows data to be read and written from the processing unit 11*p*, a read only memory (ROM) that allows data to be read from the processing unit 11*p*, and the like may be provided. The input/output interface 11*f* is composed of, for example, an A/D converter (corresponding to the AD conversion unit in FIG. 2) which inputs sensor signals outputted from the voltage sensor 51, the current sensor 61, the temperature sensors 7*i* (i=1 to 6), and the like, to the processing unit 11*p*, an interface for outputting the gate signals 8*i*1 (i=1 to 6) and the like to the gate driving units 8*i*

(i=1 to 6), and the like. The gate driving units **8*i* (i=1 to 6) may be provided in the driving controller 11**.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF THE REFERENCE CHARACTERS

10 power conversion device
11 driving controller
20 DC power supply
**4*i*** (i=1 to 6) semiconductor switching element
**8*i*** (i=1 to 6) gate driving unit
**8*i*2** (i=1 to 6) gate voltage reference value
**8*i*3** (i=1 to 6) gate resistance reference value
51 voltage sensor
511 DC voltage detection value
61 current sensor
611 current detection value
**7*i*** (i=1 to 6) temperature sensor
**7*i*1** (i=1 to 6) temperature detection value
112 driving condition setting unit
911 carrier frequency reference value
9411 semiconductor switching element conduction loss characteristic
9421 semiconductor switching element switching loss characteristic
951 gate signal pattern
1122 loss calculation unit
1123 driving condition update unit

The invention claimed is:

1. A power conversion device comprising a driving controller which controls a semiconductor switching element through PWM control, and configured to perform conversion between DC and AC, wherein the driving controller sets a pulse width for the PWM control using a PWM carrier wave, and with respect to a carrier frequency as a frequency of the PWM carrier wave, a gate voltage of the semiconductor switching element, and a gate resistance of the semiconductor switching element which are driving conditions for the semiconductor switching element, at a predetermined update timing, the driving controller obtains, through calculation, loss in the semiconductor switching element at present during a predetermined loss calculation period, on the basis of the driving conditions at present, and the driving controller repeats, a predetermined number of times, processing of obtaining the loss during the loss calculation period through calculation while changing the driving conditions, to determine the driving conditions that minimize the loss, and controls the semiconductor switching element with the determined driving conditions.

2. The power conversion device according to claim 1, wherein regarding the driving conditions, a change range of the carrier frequency, a change range of the gate voltage, and a change range of the gate resistance are set, and the carrier frequency, the gate voltage, and the gate resistance are set as functions in a period of at least one cycle of the AC so as to be within the respective set change ranges.

3. The power conversion device according to claim 1, wherein the loss is obtained by applying a temperature of the semiconductor switching element, a DC voltage on the DC side of the power conversion device, an AC current on the AC side of the power conversion device, and the driving conditions, to a conduction loss characteristic which is loss in voltage drop due to a flowing current of the semiconductor switching element with the gate voltage, a junction temperature of the semiconductor switching element, and the flowing current of the semiconductor switching element given as parameters, and a switching loss characteristic which is loss in switching of the semiconductor switching element with the gate voltage, the gate resistance, the junction temperature of the semiconductor switching element, a DC applied voltage to the semiconductor switching element, and the flowing current of the semiconductor switching element given as parameters.

4. The power conversion device according to claim 1, wherein the loss calculation period is a period of at least one cycle of the AC.

5. The power conversion device according to claim 1, wherein the update timing is set at intervals of an integer multiple of one cycle of the AC.

6. The power conversion device according to claim 1, wherein driving condition parameters to change the driving conditions are the carrier frequency and at least one of the gate voltage of the semiconductor switching element and the gate resistance of the semiconductor switching element.

7. The power conversion device according to claim 2, wherein a motor is connected to the AC side, and regarding a lower limit value of the change range of the gate resistance, from an upper limit of a switching speed of the semiconductor switching element determined by an allowable value of a surge voltage of the semiconductor switching element, an upper limit of a switching speed of the semiconductor switching element determined by an allowable value of a surge voltage of the motor, and an upper limit of a switching speed of the semiconductor switching element determined by constraints due to noise generated by the power conversion device and false turn-on of the semiconductor switching element, a gate resistance corresponding to the upper limit of the switching speed that is slowest is determined as the lower limit value at each phase of the AC, and thus the lower limit value of the change range of the gate resistance is determined as a function in a period of at least one cycle of the AC.

8. The power conversion device according to claim 2, wherein the loss is obtained by applying a temperature of the semiconductor switching element, a DC voltage on the DC side of the power conversion device, an AC current on the AC side of the power conversion device, and the driving conditions, to a conduction loss characteristic which is loss in voltage drop due to a flowing current of the semiconductor switching element with the gate voltage, a junction temperature of the semiconductor switching element, and the flowing current of the semiconductor switching element given as parameters, and a switching loss characteristic which is loss in switching of the semiconductor switching element with the gate voltage, the gate resistance, the junction temperature of the semiconductor switching element, a DC applied voltage to the semiconductor switching element, and the flowing current of the semiconductor switching element given as parameters.

9. The power conversion device according to claim 2, wherein the loss calculation period is a period of at least one cycle of the AC.

10. The power conversion device according to claim 2, wherein the update timing is set at intervals of an integer multiple of one cycle of the AC.

11. The power conversion device according to claim 2, wherein driving condition parameters to change the driving conditions are the carrier frequency and at least one of the gate voltage of the semiconductor switching element and the gate resistance of the semiconductor switching element.

12. A power conversion device comprising a driving controller which controls a semiconductor switching element through PWM control, and configured to perform conversion between DC and AC, wherein the driving controller sets a pulse width for the PWM control using a PWM carrier wave, and with respect to a carrier frequency as a frequency of the PWM carrier wave, a gate voltage of the semiconductor switching element, and a gate resistance of the semiconductor switching element which are driving conditions for the semiconductor switching element, at a predetermined update timing, the driving controller obtains, through calculation, loss in the semiconductor switching element during a predetermined loss calculation period, on the basis of the driving conditions at present, and in a case where the loss is greater than a predetermined value, the driving controller repeats, a predetermined number of times, processing of obtaining the loss during the loss calculation period through calculation while changing the driving conditions, to determine the driving conditions that minimize the loss, and controls the semiconductor switching element with the determined driving conditions.

13. The power conversion device according to claim 12, wherein regarding the driving conditions, a change range of the carrier frequency, a change range of the gate voltage, and a change range of the gate resistance are set, and the carrier frequency, the gate voltage, and the gate resistance are set as functions in a period of at least one cycle of the AC so as to be within the respective set change ranges.

14. The power conversion device according to claim 12, wherein the loss is obtained by applying a temperature of the semiconductor switching element, a DC voltage on the DC side of the power conversion device, an AC current on the AC side of the power conversion device, and the driving conditions, to a conduction loss characteristic which is loss in voltage drop due to a flowing current of the semiconductor switching element with the gate voltage, a junction temperature of the semiconductor switching element, and the flowing current of the semiconductor switching element given as parameters, and a switching loss characteristic which is loss in switching of the semiconductor switching element with the gate voltage, the gate resistance, the junction temperature of the semiconductor switching element, a DC applied voltage to the semiconductor switching element, and the flowing current of the semiconductor switching element given as parameters.

15. The power conversion device according to claim 12, wherein the loss calculation period is a period of at least one cycle of the AC.

16. The power conversion device according to claim 12, wherein the update timing is set at intervals of an integer multiple of one cycle of the AC.

17. The power conversion device according to claim 12, wherein driving condition parameters to change the driving conditions are the carrier frequency and at least one of the gate voltage of the semiconductor switching element and the gate resistance of the semiconductor switching element.

18. The power conversion device according to claim 13, wherein a motor is connected to the AC side, and regarding a lower limit value of the change range of the gate resistance, from an upper limit of a switching speed of the semiconductor switching element determined by an allowable value of a surge voltage of the semiconductor switching element, an upper limit of a switching speed of the semiconductor switching element determined by an allowable value of a surge voltage of the motor, and an upper limit of a switching speed of the semiconductor switching element determined by constraints due to noise generated by the power conversion device and false turn-on of the semiconductor switching element, a gate resistance corresponding to the upper limit of the switching speed that is slowest is determined as the lower limit value at each phase of the AC, and thus the lower limit value of the change range of the gate resistance is determined as a function in a period of at least one cycle of the AC.

* * * * *